United States Patent [19]

Inoue et al.

[11] 4,440,911

[45] Apr. 3, 1984

[54] MODIFIED POLYETHYLENE AND LAMINATE THEREOF

[75] Inventors: Hiroshi Inoue; Masaaki Isoi, both of Saitama; Kazuo Sei, Kanagawa, all of Japan

[73] Assignee: Toa Nenryo Kogyo Kabushiki Kaisha, Tokyo, Japan

[21] Appl. No.: 359,401

[22] Filed: Mar. 18, 1982

[30] Foreign Application Priority Data

Apr. 7, 1981 [JP] Japan .................................. 56-51098

[51] Int. Cl.³ .......................................... C08F 255/02
[52] U.S. Cl. .................................. 525/301; 525/285; 525/309; 525/74; 525/78; 428/461
[58] Field of Search .................... 525/285, 301, 74, 78

[56] References Cited

U.S. PATENT DOCUMENTS

| | | | |
|---|---|---|---|
| 3,236,917 | 2/1966 | Natta | 525/285 |
| 3,849,516 | 11/1974 | Plank | 525/78 |
| 3,873,643 | 3/1975 | Wu | 525/285 |
| 3,928,497 | 12/1975 | Ohmori | 525/285 |
| 3,953,541 | 4/1976 | Fuji | 525/285 |
| 3,966,845 | 6/1976 | Brederode | 525/78 |
| 4,134,927 | 1/1979 | Tomoshige | 525/285 |
| 4,198,327 | 4/1980 | Matsumoto | 525/74 |

*Primary Examiner*—Paul R. Michl
*Attorney, Agent, or Firm*—R. L. Graham

[57] ABSTRACT

A linear low density polyethylene (a copolymer of ethylene and alpha-olefin) reacted with a carboxylic acid is disclosed. Laminates and compositions employing the modified polyethylene and/or synthetic rubber are also disclosed.

11 Claims, No Drawings

MODIFIED POLYETHYLENE AND LAMINATE THEREOF

BACKGROUND OF THE INVENTION

1. Field of the Invention

The present invention relates to a modified polyethylene or a modified polyethylene composition and a laminate which includes said modified polyethylene or said modified polyethylene composition. More particularly, the present invention relates to a modified polyethylene or a composition containing the modified polyethylene and a laminate including the modified polyethylene or the modified polyethylene composition.

2. Description of the Prior Art

Japanese unpatented publication Nos. 51-122152 (1976), 52-25845 (1977), and 50-4189 (1975) disclose (a) medium- and low-pressure high density polyethylene (HDPE) and high-pressure low density polyethylene (LDPE) modified with an unsaturated carboxylic acid or a derivative thereof and (b) a mixture of the modified polyethylene and unmodified polyethylene. These compositions are disclosed as being used to improve the corrosion resistance, external appearance, and food sanitation of metal pipes, or to remedy drawbacks inherent in metal pipes, metal plates, electric wires and cables, wires, and a variety of synthetic resins.

Modified polyethylenes obtained by modifying conventional HDPE or LDPE, or compositions containing modified polyethylene and unmodified polyethylene do not have a sufficient bond strength for metals such as steel and aluminum and thermoplastic resins such as nylon and vinylon. Such modified polyethylene compositions are poor in ESCR and toughness when used in the form of laminates formed by extrusion coating, powder coating, or coextrusion. Moreover, modified LDPE is poor in flowability because it has long branches and a broad molecular weight distribution. This drawback is not remedied even when LDPE having a high melt flow index (abbreviated as MI hereunder) is used as the base polymer. The poor flowability is detrimental to powder coating in which the molten resin should flow under no load.

SUMMARY OF THE INVENTION

Surprisingly, it has been found that linear low density polyethylene copolymer (L-LDPE) modified in accordance with this invention is superior in ESCR adhesion and no load flowability. The modified polyethylene comprises L-LDPE reacted with an unsaturated carboxylic acid or derivative thereof and having a narrow molecular weight distribution. The present invention also contemplates compositions and/or laminates containing the modified polyethylene. The present invention contemplates the following compositions:

Thus, it is an object of this invention to provide:

(1) a modified polyethylene which comprises L-LDPE reacted with an unsaturated carboxylic acid or a derivative thereof, said L-LDPE being a copolymer of ethylene and alpha-olefin and having a density of 0.915 to 0.935 and the weight-average molecular weight/number-average molecular weight ratio (abbreviated as Mw/Mn hereunder) from 3 to 12;

(2) a modified polyethylene composition which comprises blended therein (A) modified polyethylene which is L-LDPE reacted with an unsaturated carboxylic acid or a derivative thereof, said L-LDPE being a copolymer of ethylene and alpha-olefin and having a density of 0.915 to 0.935 and the Mw/Mn from 3 to 12, (B) synthetic rubber, and/or (C) said L-LDPE;

(3) a laminate composed of a composition and a metal or thermoplastic resin, said composition comprising blended therein (A) modified polyethylene which is L-LDPE reacted with an unsaturated carboxylic acid or a derivative thereof, said L-LDPE being a copolymer of ethylene and alpha-olefin and having a density of 0.915 to 0.935 and the Mw/Mn from 3 to 12, (B) synthetic rubber, and/or (C) said L-LDPE.

The modified polyethylene has a high environmental stress cracking resistance (ESCR), high tensile elongation, good flowability, and high bond strength. The modified polyethylene also enhances the properties of compositions and laminates containing them.

DESCRIPTION OF THE PREFERRED EMBODIMENTS

The L-LDPE used in this invention is produced by copolymerizing ethylene with alpha-olefin selected from the group consisting of butene-1, pentene-1, hexene-1, 4-methylpentene-1, heptene-1, and octene-1, and preferably from the group consisting of butene-1, hexene-1, 4-methylpentene-1, and octene-1, at a ratio of 3 to 14 wt.% in the presence of a chromium catalyst or Ziegler catalyst by the gas phase method, liquid phase method, or solution method. L-LDPE thus produced has a density of 0.915 to 0.935, an Mw/Mn ratio of 3 to 12, and an MI of 0.1 to 50 g/10 min [as measured by ASTM D-1238E (190° C., 2160 g); the same shall apply hereunder]. Most preferable among them is one which is produced by the gas phase method.

The unsaturated carboxylic acid used in this invention includes acrylic acid, methacrylic acid, maleic acid, fumaric acid, itaconic acid, citraconic acid, endo-bicyclo[2,2,1]-1,4,5,6,7,7-hexachloro-5-heptene-2,3-dicarboxylic acid, endo-bicyclo[2,2,1]-5-heptene-2,3-dicarboxylic acid, and cis-4-cyclohexene-1,2-dicarboxylic acid. The derivative of carboxylic acid used in this invention includes acid anhydrides and esters such as maleic anhydride, citraconic anhydride, endo-bicyclo[2,2,1]-1,4,5,6,7,7-hexachloro-5-heptene-2,3-dicarboxylic acid anhydride, endo-bicyclo-[2,2,1]-5-heptene-2,3-dicarboxylic acid anhydride, cis-4-cyclohexene-1,2-dicarboxylic acid anhydride, methyl acrylate, methyl methacrylate, ethyl acrylate, ethyl methacrylate, butyl acrylate, butyl methacrylate, and maleate esters (monoester and diester).

The synthetic rubber used in one of the blend embodiments of this invention includes a copolymer rubber of ethylene and an alpha-olefin selected from the group consisting of propylene, butene-1, pentene-1, hexene-1, octene-1, and 4-methylpentene-1; ethylene-propylene-nonconjugated diene rubber (EPDM), isoprene rubber (IR), butyl rubber (BR), and styrene-butadiene thermoplastic rubber (SBR). The preferred synthetic rubber is ethylene-alpha-olefin copolymer rubber (EBR). These synthetic rubbers should preferably have a Mooney viscosity of 10 to 150 ($ML_{1+4}$ 100° C., JIS K6300 [the same shall apply hereunder]), and a crystallization degree less than 30%. Such ethylene-alpha-olefin copolymer rubbers usually have a density lower than 0.9.

The reaction of L-LDPE with an unsaturated carboxylic acid or a derivative thereof can be accomplished by any known method. For instance, L-LDPE, an unsaturated carboxylic acid or a derivative thereof, and an initiator of organic peroxide are put together in the presence or absence of solvent, and mixed preliminarily by a Henschel mixer or ribbon blender and then melted and kneaded by a Banbury mixer or a single- or multi-screw extruder at a temperature higher than the melting point of polyethylene but lower than 250° C. Examples of organic peroxides include di-t-butyl peroxide, dicumyl peroxide, benzoyl peroxide, perhexa-2,5-benzoyl, and 2,5-dimethyl-2,5-di-(t-butylperoxy)-hexyne-3. The reaction may also be carried out by adding an unsaturated carboxylic acid or a derivative thereof and an initiator to a solution in which L-LDPE is dissolved.

The unsaturated carboxylic acid or a derivative thereof should preferably be added to L-LDPE in an amount of 0.01 to 3 wt.%. Therefore, the quantity of the unsaturated carboxylic acid or a derivative thereof should preferably be 0.05 to 5 parts by weight based on 100 parts by weight of unmodified L-LDPE, and the quantity of the initiator should preferably be 0.001 to 0.5 parts by weight based on 100 parts by weight of unmodified L-LDPE. If the content of the unsaturated carboxylic acid or a derivative thereof in the resulting modified polyethylene is less than 0.01 wt.%, no improvement is made in adhesion; and conversely, if it is more than 3 wt.%, no further improvement is made in adhesion but gels and discoloration occur.

The modified polyethylene composition of this invention can be obtained by incorporating the above-mentioned modified L-LDPE with synthetic rubber and/or L-LDPE, followed by melting and mixing of known method. More specifically, modified polyethylene and synthetic rubber and/or L-LDPE are mixed by a Henschel mixer or ribbon blender and the mixture is melted and kneaded at a temperature higher than the melting point of polyethylene but lower than 250° C. using a Banbury mixer or single-screw or multiscrew extruder. For synthetic rubber in the form of bale, a Banbury mixer or roll mill is suitable for heating, melting, and mixing. The blending ratio of the synthetic rubber and/or L-LDPE should be varied according to the quantity of the unsaturated acid or a derivative thereof to be added to the modified polyethylene, but preferably be in such a range that the quantity of the unsaturated carboxylic acid or a derivative thereof is 0.01 to 3 wt.% in the resulting composition and the quantity of the synthetic rubber is less than 30 wt.% in the resulting composition. The above limits for the unsaturated carboxylic acid or a derivative thereof are established for the same reason as mentioned for the modified polyethylene. If the synthetic rubber is incorporated more than 30 wt.%, ESCR is improved but mechanical strength decreases. The synthetic rubber in the composition of this invention may be replaced by a modified synthetic rubber prepared by adding 0.01 to 3 wt.% of the unsaturated carboxylic acid or a derivative thereof as in the modified L-LDPE. In such a case, too, the modified synthetic rubber should be incorporated less than 30 wt.% for the reason mentioned above.

Metals used for making the laminate of this invention include iron, aluminum, copper, zinc, nickel, tin, stainless steel, brass, galvanized steel, and tinplate. Thermoplastic resins used for making the laminate of this invention include polyamides such as nylon-6, nylon-66, nylon-11, nylon-12, nylon 6–10; polyolefin homopolymers or copolymers such as polypropylene and polybutene; partially acetalized polyvinyl alcohol (vinylon); partially hydrolized ethylene-vinyl acetate copolymer (eval); polyesters such as polyethylene terephthalate and polybutylene terephthalate; and polyvinyl chloride. Preferable among them are nylon and vinylon.

The laminate of this invention is obtained by laminating the modified polyethylene of this invention or the modified polyethylene composition of this invention in which said modified polyethylene is incorporated with synthetic rubber and/or L-LDPE, and a member selected from the above-mentioned metals or thermoplastic resins.

The laminate of this invention can be produced by any known method; for example, a method for heat bonding members which have been previously formed into a film or sheet, a method for laminating layers outside the die, a method for laminating layers inside the die (coextrusion), an extrusion coating method, and powder coating. Usually, the metal layers to be laminated undergo preliminary treatment such as degreasing with solvent, pickling, shot blasting, and bonderizing. High bond strength between layers can be achieved by applying an epoxy resin primer. A modified epoxy resin primer of one-part system or two-part system is preferable from the standpoint of heat resistance and stability.

The laminate of this invention is basically of two-layer structure including one layer of the modified polyethylene or modified polyethylene composition of this invention and the other layer selected from the aforesaid metals and thermoplastic resins. Various combinations are possible as required. For example, the modified polyethylene or modified polyethylene composition (referred to as the composition herein)/a metal layer; the modified polyethylene or composition/a thermoplastic resin layer; a metal layer/the modified polyethylene or composition/a metal layer; a metal layer/the modified polyethylene or composition/a thermoplastic resin layer; and a thermoplastic resin layer/the modified polyethylene or composition/a thermoplastic resin layer. In addition, it is also possible to combine layers of other substances such as fiber, paper, and wood.

The modified polyethylene or the modified polyethylene composition of this invention adheres to aforesaid metals or thermoplastic resins with a high bond strength. Moreover, because of high flowability it can be used for powder coating, extrusion coating, and extrusion molding. Being superior is not only bond strength but also ESCR and toughness, the modified polyethylene or the composition can also be used for coating the steel wires, electric wires, cables, metal plates, metal pipes, and metal inserts, and for lamination with multilayer films and sheets formed by coextrusion with a variety of resins and multilayered bottles and containers formed by multilayer blow molding.

The modified polyethylene or the composition of this invention may be incorporated, as required, with a weathering agent, heat stabilizer, molding aid, anti-oxidant, colorant, and the like.

The invention is described in detail by the following examples. In Examples and Referential Examples, "parts" means "parts by weight", and the peel strength (which indicates adhesiveness), high-speed tensile elongation, and melt tensile strength were measured by the following methods.

(1) Peel strength
Preparation of test piece
(A) Aluminum laminate
A three-layered laminate consisting of two aluminum sheets (0.1 mm thick) sandwiching an intermediate layer (0.1 mm thick) of the composition, was cut into a 25 mm wide specimen.

(B) Steel laminate

A two-layered laminate consisting of a bonderized steel plate (3.2×50×150 mm) and a layer (1 mm thick) of the composition, was cut into a 10 mm wide specimen. A gripping surface was formed by removing the resin layer, up to 20 mm from the end, using a sharp knife.

(C) Nylon laminate

A three-layered laminate consisting of two nylon-6 layers (0.1 mm thick) sandwiching an intermediate layer (0.1 mm thick) of the composition, was cut into a 25 mm wide specimen.

These specimens were measured for 90° peel strength on an Instron type universal tester.

(2) ESCR (in conformity with ASTM D-1693)
   (A) Test piece: 38×12.7×2 mm
   (B) Surface active agent: 10% aqueous solution of Igepal
   (C) Test temperature: 50° C.
(3) High-speed tensile elongation (JIS K-6760)
   (A) Rate of pulling: 500 mm/min ±10%
(4) Melt tensile strength The flowability was evaluated by measuring the tensile force required to pull at a constant rate the molten resin extruded from the orifice of a melt indexer under the following conditions.

(A) Orifice: 2.095 mmφ×8 mm
(B) Test temperature: 190° C.
(C) Extrusion rate of resin: 10 mm/min
(D) Take-up rate of resin: 5.5 m/min

EXAMPLES 1 to 9

A modified polyethylene was prepared by mixing L-LDPE, at the ratio shown in Table 1, with acrylic acid, maleic anhydride, or endo-bicyclo-[2,2,1]-5-heptene-2,3-dicarboxylic acid anhydride (referred to as himic anhydride), and 2,5-dimethyl-2,5-di-(t-butyl-peroxy)-hexyne-3 (initiator). After mixing with a Henschel mixer, the mixture was melted, kneaded, and pelletized at 220° C. using an extruder running at 60 rpm. Using the resulting pellets, the modified polyethylene was measured for physical properties and evaluated for adhesion by measuring 90° peel strength of laminates with aluminum sheet (Al), steel plate (Fe), or nylon-6. The results are shown in Table 1.

TABLE 1

| | Example No. | | | | | | | | |
|---|---|---|---|---|---|---|---|---|---|
| | 1 | 2 | 3 | 4 | 5 | 6 | 7 | 8 | 9 |
| L-LDPE (as raw material) | | | | | | | | | |
| MI (g/10 min) | 12.0 | 12.0 | 12.0 | 12.0 | 12.0 | 12.0 | 12.0 | 5.0 | 1.0 |
| Density (g/cc) | 0.926 | 0.926 | 0.926 | 0.926 | 0.926 | 0.926 | 0.926 | 0.934 | 0.920 |
| Mw/Mn | 5.0 | 5.0 | 5.0 | 5.0 | 5.0 | 7.0 | 7.0 | 6.0 | 6.0 |
| Comonomer* | Bu | Bu | Bu | Bu | Bu | Pe | MePe | Bu | Bu |
| Unsaturated carboxylic acid | | | | | | | | | |
| Kind** | MA | MA | MA | MH | AA | MA | MA | MA | MA |
| Quantity added (parts) | 0.1 | 0.6 | 0.3 | 0.3 | 0.6 | 0.3 | 0.3 | 0.3 | 0.3 |
| Initiator | | | | | | | | | |
| Quantity added (parts) | 0.025 | 0.025 | 0.05 | 0.025 | 0.025 | 0.025 | 0.025 | 0.025 | 0.025 |
| Physical Properties of modified L-LDPE | | | | | | | | | |
| MI 190° C. (g/10 min) | 7.6 | 7.4 | 4.0 | 7.4 | 7.3 | 7.0 | 7.1 | 4.0 | 0.8 |
| Density (g/cc) | 0.926 | 0.926 | 0.926 | 0.926 | 0.926 | 0.926 | 0.926 | 0.934 | 0.920 |
| Q'ty of carboxylic acid added (wt %) | 0.09 | 0.55 | 0.28 | 0.23 | 0.58 | 0.28 | 0.28 | 0.28 | 0.27 |
| ESCR $F_{50}$ (hours) | 5.0 | 5.0 | 17.0 | 5.0 | 5.0 | 30.0 | 40.0 | 25.0 | 400 |
| High-speed tensile elongation 50 cm/min (%) | 400 | 400 | 450 | 400 | 400 | 550 | 600 | 480 | 600 |
| Melt tensile strength 190° C. (g) | 0.7 | 0.7 | 1.0 | 0.7 | 0.7 | 0.8 | 0.8 | 1.0 | 4.0 |
| Peel strength | | | | | | | | | |
| Fe (kg/cm) | 5.0 | 5.1 | 5.4 | 5.0 | 5.0 | 5.5 | 5.7 | 6.0 | 6.5 |
| Al (kg/2.5 cm) | 4.5 | 4.5 | 5.0 | 4.5 | 4.5 | 4.8 | 5.0 | 5.0 | 5.5 |
| Nylon-6 (kg/2.5 cm) | 10.0 | 11.0 | 10.0 | 10.0 | 9.0 | 11.0 | 12.0 | 11.0 | 11.0 |

Note:
*Bu: Butene-1, Pe: Pentene-1, MePe: 4-Methyl-pentene-1
**MA: Maleic anhydride, HM: Himic anhydride, AA: Acrylic acid

REFERENTIAL EXAMPLES 1 TO 6

Modified polyethylenes were prepared as in Example 1 by incorporating 100 parts each of L-LDPE, LDPE, and HDPE with 0.3 part of maleic anhydride and 0.025 part of 2,5-dimethyl-2,5-di-(t-butylperoxy)hexyne-3. Physical properties and bond strength were measured as in Example 1. The results are shown in Table 2.

TABLE 2

| | Ref. Example No. | | | | | |
|---|---|---|---|---|---|---|
| | 1 | 2 | 3 | 4 | 5 | 6 |
| PE (as raw material) | L-LDPE | LDPE | LDPE | HDPE | HDPE | HDPE(50%) LDPE(50%) |
| MI (g/10 min) | 2.0 | 10.0 | 2.0 | 8.0 | 1.0 | 8.0    2.0 |
| Density (g/cc) | 0.926 | 0.919 | 0.919 | 0.960 | 0.960 | 0.960  0.919 |
| Mw/Mn | 21 | — | — | — | — | — |
| Comonomer | Butene-1 | — | — | — | — | — |
| Physical Properties of modified polyethylene | | | | | | |
| MI 190° C. (g/10 min) | 1.5 | 6.5 | 1.5 | 4.0 | 0.6 | 2.5 |
| Density (g/cc) | 0.926 | 0.919 | 0.919 | 0.960 | 0.960 | 0.940 |
| Q'ty of carboxylic | 0.27 | 0.26 | 0.26 | 0.21 | 0.20 | 0.22 |

TABLE 2-continued

|  | Ref. Example No. | | | | | |
| --- | --- | --- | --- | --- | --- | --- |
|  | 1 | 2 | 3 | 4 | 5 | 6 |
| acid added (wt %) | | | | | | |
| ESCR F$_{50}$ (hours) | 20 | 1(—) | 1(—) | 1(—) | 2.0 | 1(—) |
| High-speed tensile elongation 50 cm/min (%) | 400 | 280 | 400 | 20 | 30 | 30 |
| Melt tensile strength 190° C. (g) | 8.0 | 4.0 | 10.0 | 2.0 | 5.0 | 5.0 |
| Peel strength | | | | | | |
| Fe (kg/cm) | 3.5 | 2.0 | 2.0 | 2.5 | 2.5 | 2.5 |
| Al (kg/2.5 cm) | 2.5 | 2.5 | 2.5 | 3.0 | 3.0 | 2.5 |
| Nylon-6 (kg/2.5 cm) | 7.0 | 4.0 | 3.0 | 4.0 | 4.0 | 2.0 |

EXAMPLES 10 TO 14

In Examples 10 to 13, the L-LDPE used as a raw material in Example 1 was incorporated with the modified L-LDPE obtained in Example 2 at the ratios shown in Table 3. In Example 14, the L-LDPE used as a raw material in Example 8 was incorporated with the modified L-LDPE obtained in Example 1 at the ratio shown in Table 3. The mixtures were melted and kneaded to give the compositions of this invention. The resulting compositions were measured for physical properties and bond strength as in Example 1. The results are shown in Table 3.

TABLE 3

|  | Example No. | | | | |
| --- | --- | --- | --- | --- | --- |
|  | 10 | 11 | 12 | 13 | 14 |
| Modified L-LDPE (parts) | 70 | 50 | 30 | 10 | 50 |
| MI 190° C. (g/10 min) | 7.4 | 7.4 | 7.4 | 7.4 | 4.0 |
| Density (g/cc) | 0.926 | 0.926 | 0.926 | 0.926 | 0.934 |
| Mw/Mn | 5.5 | 5.5 | 5.5 | 5.5 | 5.5 |
| Comonomer* | Bu | Bu | Bu | Bu | Bu |
| Q'ty of carboxylic acid added (wt %) | 0.55 | 0.55 | 0.55 | 0.55 | 0.28 |
| Unmodified L-LDPE (parts) | 30 | 50 | 70 | 90 | 50 |
| MI 190° C. (g/10 min) | 12.0 | 12.0 | 12.0 | 12.0 | 5.0 |
| Density (g/cc) | 0.926 | 0.926 | 0.926 | 0.926 | 0.934 |
| Mw/Mn | 5.0 | 5.0 | 5.0 | 5.0 | 6.0 |
| Comonomer* | Bu | Bu | Bu | Bu | Bu |
| Physical Properties of modified L-LDPE | | | | | |
| MI 190° C. (g/10 min) | 8.5 | 9.2 | 10.0 | 10.5 | 4.3 |
| Density (g/cc) | 0.926 | 0.926 | 0.926 | 0.926 | 0.934 |
| Q'ty of carboxylic acid added (wt %) | 0.39 | 0.27 | 0.13 | 0.06 | 0.14 |
| ESCR F$_{50}$ (hours) | 5.0 | 5.0 | 4.0 | 4.0 | 17.0 |
| High-speed tensile elongation 50 cm/min (%) | 400 | 400 | 400 | 400 | 450 |
| Melt tensile strength 190° C. (g) | 0.7 | 0.7 | 0.7 | 0.6 | 1.0 |
| Peel strength | | | | | |
| Fe (kg/cm) | 5.0 | 5.0 | 5.2 | 5.2 | 6.0 |
| Al (kg/2.5 cm) | 4.4 | 4.5 | 4.6 | 4.6 | 5.2 |
| Nylon-6 (kg/2.5 cm) | 10.0 | 10.0 | 9.0 | 6.0 | 10.0 |

Note:
*Bu: Butene-1

REFERENTIAL EXAMPLES 7 AND 8

The L-LDPE used as the raw material in Example 1 was incorporated, at the ratio shown in Table 4, with the modified L-LDPE obtained in Example 1. The mixture was melted and kneaded to give the composition of this invention. The resulting compositions were measured for physical properties and bond strength as in Example 1. The results are shown in Table 4.

TABLE 4

|  | Ref. Example No. | |
| --- | --- | --- |
|  | 7 | 8 |
| Modified L-LDPE (parts) | 10 | 5 |
| MI 190° C. (g/10 min) | 7.6 | 7.6 |
| Density (g/cc) | 0.926 | 0.926 |
| Mw/Mn | 5.5 | 5.5 |
| Comonomer | Butene-1 | Butene-1 |
| Q'ty of carboxylic acid added (wt %) | 0.09 | 0.09 |
| Unmodified L-LDPE (parts) | 90 | 95 |
| MI 190° C. (g/10 min) | 12.0 | 12.0 |
| Density (g/cc) | 0.926 | 0.926 |
| Mw/Mn | 5.0 | 5.0 |
| Comonomer | Butene-1 | Butene-1 |
| Physical Properties of modified L-LDPE | | |
| MI 190° C. (g/10 min) | 10.5 | 10.7 |
| Density (g/cc) | 0.926 | 0.926 |
| Q'ty of carboxylic acid added (wt %) | 0.009 | 0.005 |
| ESCR F$_{50}$ (hours) | 4.0 | 4.0 |
| High-speed tensile elongation 50 cm/min (%) | 400 | 400 |
| Melt tensile strength 190° C. (g) | 0.6 | 0.6 |
| Peel strength | | |
| Fe (kg/cm) | 1.0 | 0.7 |
| Al (kg/2.5 cm) | 0.7 | 0.6 |
| Nylon-6 (kg/2.5 cm) | 1.5 | 1.0 |

EXAMPLES 15 TO 19

Various compositions were prepared by blending the L-LDPE used in Example 1, the modified L-LDPE used in Examples 1 and 8, ethylene-butene-1 copolymer rubber, or ethylene-butene-1 copolymer rubber modified with maleic anhydride as in Example 1. These compositions were measured for physical properties and 90° peel strength for laminates produced from them. The results are shown in Table 5.

TABLE 5

|  | Example No. | | | | | | |
| --- | --- | --- | --- | --- | --- | --- | --- |
|  | 15 | 16 | 17 | 18 | | 19 | |
| Modified L-LDPE (parts) | 90 | 90 | 90 | 45 | — | 45 | — |
| Unmodified L-LDPE (parts) | | | | | | | |
| MI (g/10 min) | 7.6 | 4.0 | 7.6 | 7.6 | 12.0 | 7.6 | 12.0 |
| Density (g/cc) | 0.926 | 0.934 | 0.926 | 0.926 | 0.926 | 0.926 | 0.926 |
| Mw/Mn | — | — | — | — | 5.0 | — | 5.0 |
| Q'ty of carboxylic | 0.28 | 0.55 | 0.28 | 0.28 | — | 0.28 | — |

TABLE 5-continued

| | Example No. | | | | |
|---|---|---|---|---|---|
| | 15 | 16 | 17 | 18 | 19 |
| acid added (wt %) | | | | | |
| Comonomer (Bu = butene-1) | Bu | Bu | Bu | Bu Bu | Bu Bu |
| Ethylene-butene-1 copolymer rubber (parts) | 10 | 10 | — | 10 | — |
| Modified ethylene-butene-1 copolymer rubber (parts) | — | — | 10 | — | 10 |
| MI | 4.0 | 4.0 | 2.8 | 4.0 | 2.8 |
| Density | 0.88 | 0.88 | 0.88 | 0.88 | 0.88 |
| Q'ty of carboxylic acid added (wt %) | — | — | 1.0 | — | 1.0 |
| Physical Properties of modified L-LDPE composition | | | | | |
| MI 190° C. (g/10 min) | 6.8 | 3.8 | 6.3 | 7.0 | 6.0 |
| Density (g/cc) | 0.922 | 0.930 | 0.922 | 0.922 | 0.922 |
| Q'ty of carboxylic acid added (wt %) | 0.25 | 0.50 | 0.35 | 0.13 | 0.23 |
| ESCR $F_{50}$ (hours) | >1000 | >1000 | >1000 | >1000 | >1000 |
| High-speed tensile elongation 50 cm/min (%) | 700 | 700 | 700 | 700 | 700 |
| Melt tensile strength 190° C. (g) | 0.7 | 1.0 | 0.8 | 0.7 | 0.8 |
| Peel strength | | | | | |
| Fe (kg/cm) | 5.5 | 6.0 | 5.0 | 5.0 | 6.0 |
| Al (kg/2.5 cm) | 4.0 | 5.0 | 4.5 | 4.5 | 5.5 |
| Nylon-6 (kg/2.5 cm) | 10.0 | 10.0 | 13.0 | 10.0 | 14.0 |

What is claimed is:

1. A fabricable thermoplastic composition which comprises linear low density copolymer of ethylene and an alpha-olefin wherein said alpha-olefin is selected from the group consisting of butene-1, hexene-1, methyl pentene-1, and octene-1 and comprises between 3 and 14 weight percent of the copolymer, said copolymer being reacted with from 0.01 to 3 wt. % of an unsaturated carboxylic acid or a derivative thereof, based on the weight of the copolymer, said linear low density copolymer being substantially free of long chain branching and having a density of 0.915 to 0.935 and the weight-average molecular weight/number-average molecular weight ratio from 3 to 12.

2. A thermoplastic composition as defined in claim 1 wherein the alpha-olefin comprises from 3 to 14 weight percent of the linear low density polyethylene.

3. A thermoplastic composition as defined in claim 1 and further comprising blended therein an effective amount of a synthetic rubber to increase the environmental stress crack resistance of the composition, but not in excess of 30 weight percent based on the weight of the blend.

4. A thermoplastic composition as defined in claim 1 and further having therein an unmodified copolymer of ethylene and an alpha-olefin, said unmodified copolymer being substantially free of long chain branching, the weight ratio of the modified and unmodified copolymers ranging between 1/9 to 7/3.

5. A modified polyethylene as defined in claim 3 and further having therein a linear low density polyethylene.

6. A fabricable thermoplastic composition which comprises a blend of (A) a modified ethylene copolymer comprising from 97 to 86 wt.% ethylene and 3 to 14 wt. % of an alpha-olefin, said copolymer being reacted with from 0.01 to 3 wt.% based on the weight of the modified copolymer of an unsaturated carboxylic acid or a derivative thereof, said ethylene copolymer being a copolymer of ethylene and alpha-olefin selected from the group consisting of butene-1, hexene-1, methyl-pentene-1, and octene-1 and having a density of 0.915 to 0.935 and the weight-average molecular weight/number-average molecular weight ratio from 3 to 12, and being substantially free of long chain branching; and (B) synthetic rubber, the concentration of the synthetic rubber being sufficient to substantially increase the environmental stress crack resistance of the modified polyethylene, but not in excess of 30 wt% based on the weight of the composition.

7. A composition as defined in claim 6 wherein the composition further includes a an unmodified copolymer of ethylene and an alpha-olefin.

8. A composition as defined in claim 6 wherein the synthetic rubber is selected from the group consisting of ethylene-alpha-butene-1 copolymer rubber and styrene-butadiene thermoplastic rubber.

9. A composition as defined in claim 6 wherein the synthetic rubber has a Mooney viscosity of 10 to 150 and a crystallization degree of less than 30%.

10. A composition as claimed in claim 6 wherein the synthetic rubber is a copolymer rubber of ethylene and butene-1.

11. A modified thermoplastic composition as defined in claim 1 wherein the linear low density copolymer is produced by a gas phase process.

* * * * *